Figure 1:
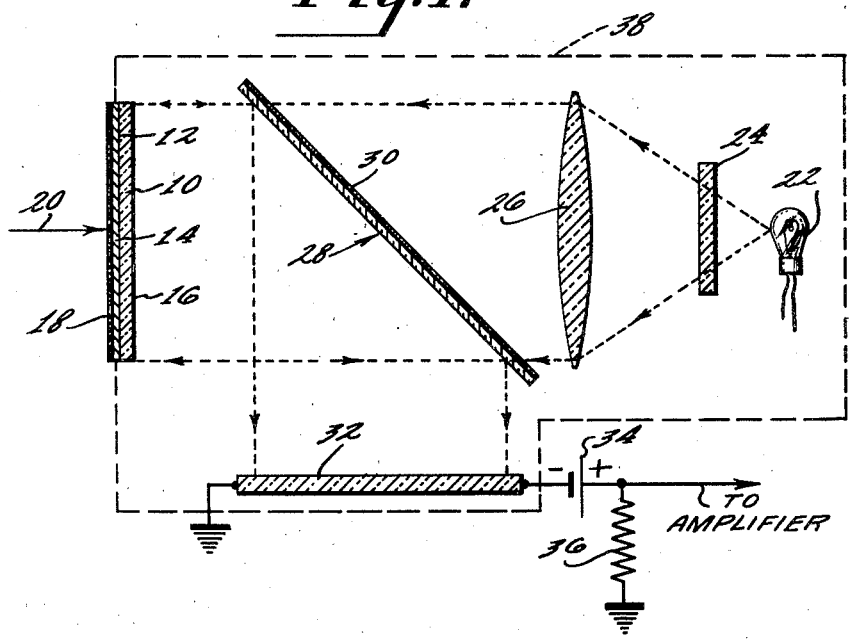

Feb. 18, 1958 — E. E. HAHN, JR., ET AL — 2,824,235
INFRA-RED RADIATION DETECTOR
Filed Nov. 30, 1954

INVENTORS
Edwin E. Hahn, Jr.
& Melvin L. Schultz
BY
ATTORNEY.

United States Patent Office 2,824,235
Patented Feb. 18, 1958

2,824,235

INFRA-RED RADIATION DETECTOR

Edwin E. Hahn, Jr., and Melvin L. Schultz, Princeton, N. J., assignors, by mesne assignments, to the United States of America as represented by the Secretary of the Navy Application November 30, 1954, Serial No. 471,946

8 Claims. (Cl. 250—83.3)

This invention relates generally to radiation detectors, and more particularly to an arrangement of components adapted to detect and measure any electromagnetic radiation that produces a change in the optical transmission characteristics of appropriately chosen materials. While neither specifically nor exclusively limited thereto, radiation detectors of the present invention are particularly useful in detecting electromagnetic radiation in the infrared spectrum.

It is an object of the present invention to provide an improved radiation detector adapted to detect and measure electromagnetic radiation.

It is another object of the present invention to provide a novel radiation detector that utilizes photo-conductive and/or semi-conductive materials characterized by changes in their optical transmission with changes in their temperature.

It is a further object of the present invention to provide an improved radiation detector employing either unmonochromatized or monochromatized light as an auxiliary source of light.

It is still a further object of the present invention to provide an improved and novel radiation detector for the detection and measurement of electromagnetic radiation that is simple in operation, easy to manufacture, and yet highly efficient in use.

In one embodiment of the invention, the radiation detector comprises a slab or relatively thin sheet of semiconductive material, such as germanium, silicon, and the like. The characteristics of the material comprising the slab are such that the optical transmission of the slab changes with temperature changes thereof, and the temperature of the slab is a function of electromagnetic radiation absorbed thereby. A reflecting surface, such as a metallic mirror coating, is evaporated onto one side or surface of the slab. An electromagnetic absorbing material, such as a carbon black coating, covers the mirror coating so that electromagnetic radiation, such as infrared rays, for example, may be absorbed thereby. Light from an auxiliary source of electromagnetic radiation, monochromatized by a filter, is directed through a semitransparent mirror and through the slab in a manner whereby the light will be reflected through the slab by the mirror coating on the slab. The reflected light, that has been transmitted through the slab twice, is directed toward the semitransparent mirror and deflected therefrom onto a radiation sensitive element, which may be a slab of photo-conductive material similar to the aforementioned slab. The radiation sensitive element is connected in a circuit in a manner to provide changes in voltage across a resistor with changes in the conductivity of the radiation sensitive element in accordance with the radiation from the auxiliary source received thereby. The light absorbing material covering the mirror coating on one surface of the slab is disposed in a manner to receive incident electromagnetic radiation, such as the infra-red rays from a heated object. Since the optical transmission of this slab varies as a function of the temperature change produced therein by the absorbed infrared rays, for example, it will be understood that the light from the auxiliary source that is transmitted twice through this slab and then directed onto the radiation sensitive element will vary the photo-conductivity of the radiation sensitive element proportionally. This latter variation in the photo-conductivity of the radiation sensitive element produces signals which may be fed to an amplifier and/or measuring means for their detection and measurement, in accordance with principles well known in the art.

In another embodiment of the radiation detector of the present invention, the light from the auxiliary source that penetrates the slab and is reflected back through the slab by the mirror coating on one surface thereof is directed directly onto the radiation sensitive element without being deflected by the semitransparent mirror. A light chopper may be provided to chop the light between the auxiliary source of light and the radiation sensitive element, in order to provide a pulsating voltage that may be amplified and detected by A. C. amplifying and detecting means. Where the slab consists of material that is not photo-sensitive beyond the absorption edge, the radiation sensitive element may consist of the same material as the slab, and an unmonochromatized auxiliary source of light may be used; and no light filter will be necessary.

Figure 2:
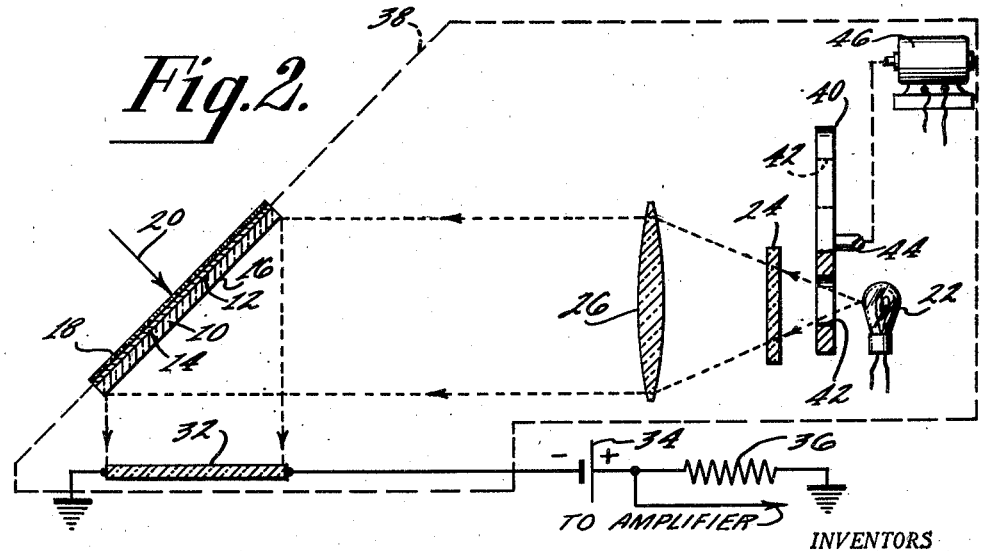

These and, perhaps, other objects and aspects of the invention will be apparent to those skilled in the art from the following more detailed descriptions considered in conjunction with the accompanying drawing, in which similar reference characters represent similar elements, and in which:

Fig. 1 is a view in sectional elevation of a radiation detector according to the teachings of the present invention, and Fig. 2 is a view similar to Fig. 1 of a modification of the radiation detector of the present invention.

Referring now to Fig. 1 there is shown a novel radiation detector, in accordance with the present invention, comprising a relatively thin sheet or slab 10 of a semiconductive material such as germanium, silicon, cadmium sulphide, zinc oxide, certain glasses, and the like. These materials are characterized in that their optical transparency characteristics, in terms of wavelengths of light vary with the temperature of the slab. The slab 10 should comprise material that has a rapid change of absorption coefficient with wavelength. Also, the material should possess a small heat capacity so that the change in the slab temperature is relatively high for a given amount of radiation to be detected and/or measured. For optimum sensitivity of the radiation detector, it is desired that the slab 10 have a large change with temperature in either the absorption coefficient or the shift of an absorption edge or peak, and a large absorption coefficient at the peak or at the absorbing side of the edge. Wafers of the semi-conductor material, such as germanium and silicon are especially suitable for the slab 10.

One large surface 12 of the slab 10 is coated with a metallic mirror coating 14 so that any light transmitted through the slab 10 from the direction of the other large surface 16 of the slab 10 will be reflected through the slab 10 by the metallic mirror coating 14. The metallic mirror coating 14 is covered with blackened light absorbing material 18, such as lamp-black, for the purpose of absorbing electromagnetic radiation, such as infra-red rays, for example.

It will now be understood that when incident electromagnetic radiation, represented by the arrow 20, falls upon the light absorbing material 18, the temperature of the slab 10 will increase and thereby alter the optical transmission characteristics thereof.

Means are provided to direct electromagnetic radiation, such as from an auxiliary source of light 22, onto and through the surface 16 of the slab 10 to the mirror coating 14, from which it will be reflected through the slab 10 again. To this end, the light from the light source 22, which may be a tungsten filament lamp energized by a suitable source of voltage (not shown) is directed through a monochromatic filter 24 to monochromatize the light, and through a focusing element 26. The light emerging from the focusing element 26 passes in substantially parallel rays through a semi-transparent mirror 28 adjacent the focusing element 26. The semi-transparent mirror 28 is angularly disposed with respect to the slab 10 in a manner whereby radiation reflected from the metallic mirror coating 14 through the slab 10 and onto the mirror 28 will be reflected again by a metallic mirror surface 30 on one surface of the mirror 28, and onto a radiation sensitive element 32, that may be a slab of photo-conductive semi-conductive material similar to that comprising the slab 10. It will be understood that the conductivity, and conversely the resistivity, of the flow of current through the radiation sensitive element 32 will vary proportionally to the amount of radiation impinging thereon. One edge of the radiation sensitive element 32 is connected to ground; and an opposite edge of the element 32 is connected to ground through a source of unidirectional voltage, such as a battery 34 and a resistor 36. The junction between the battery 34 and the resistor 36 is connected to a suitable amplifier. It will now be understood that current flowing through the circuit comprising the element 32, the battery 34 and the resistor 36 will vary in accordance with the electromagnetic radiation impinging on the element 32, whereby to produce a corresponding varying voltage across the resistor 36. The latter voltage may be amplified and detected in any suitable manner well known in the art.

The arrangement of the components of the radiation detector illustrated in Fig. 1 may be placed in a suitable light-tight container (not shown), represented by the dashed outline 38, wherein the light source 22, the filter 24, the focusing element 26, the semi-transparent mirror 28 and the photo-conductive element 32 are within the light-tight container, and wherein the surface 16 of the slab 10 faces the inside of the light-tight container and the light absorbing material 18 is exposed outside of the container in order to absorb electromagnetic radiation directed thereto.

The operation of the radiation detector described and shown in Fig. 1 will now be explained. Let it be assumed that electromagnetic radiation, such as infra-red rays from a heated object are to be detected by the radiation detector. The incident radiation of the infra-red rays, represented by the arrow 20, is absorbed by the light absorbing material 18 and the heat caused thereby changes the optical transmission characteristics of the slab 10. Light from the auxiliary source 22 is monochromatized by the filter 24 and directed toward the surface 16 of the slab 10 through the focusing element 26 and through the semi-transparent mirror 28. The envelope of the light rays from the light source 22 is bounded by the dashed lines with the arrow indications thereon to show the direction thereof. The light rays directed toward the surface 16 of the slab 10 penetrate the slab 10 up to the metallic mirror coating 14 which acts as a reflecting surface to reflect the light through the slab 10 again and onto the mirror surface 30 of the semi-transparent mirror 28. The reflected light is now directed onto the photo-conductive sensitive element 32. It will now be understood that in the absence of the infra-red radiation, represented by the arrow 20, the light from the light source 22, passing through the slab 10 twice, is presented with a certain degree of transparency of the slab 10. Under the influence of infra-red radiation, represented by the arrow 20, the temperature of the slab 10 is increased, and consequently its optical transparency is altered. Hence, under these conditions, a different amount of light from the light source 22 will pass through the slab 10 and be reflected therefrom onto the photo-conductive sensitive element 32. Thus, it is seen that the photo-conductivity of the sensitive element 32 changes when the infra-red radiation raises the temperature of the slab 10. This change in conductivity of the element 32 causes an increased or decreased voltage drop across the resistor 36 which may be amplified and detected in any well known manner known in the art.

If the slab 10 comprises a material that is not photo-conductive beyond the absorption edge then the radiation sensitive element 32 may comprise the same material as the slab 10, and an unmonochromatized auxiliary source of light 22 may be used; that is, the monochromatizing filter 24 need not be used.

Referring now to Fig. 2 there is shown a modification of the radiation detector described and illustrated in Fig. 1. The radiation detector of Fig. 2 differs from that of Fig. 1 in that the radiation, from the light 22, that passes through the slab 10 and is reflected by the metallic mirror coating 14 through the slab 10 again is reflected directly onto the element 32, whereby to vary the conduction thereof. Aside from this change in directing the reflected light from the slab 10 onto the photo-conductive element 32, the operation of the radiation detector in Fig. 2 is substantially similar to that described for the radiation detector in Fig. 1. In Fig. 2, the light from the auxiliary light source 22 may be chopped by a rotating shutter wheel 40. The shutter wheel 40 is fixed to a shaft 44 that is adapted to be rotated by a motor 46 when connected to a source of suitable operating voltage (not shown). It will now be understood that light from the light source 22 may be interrupted periodically in its path from the light source 22, through the slab 10 twice, and onto the photo-conductive element 32. With the arrangement a pulsating voltage is derived across the resistor 36, and an A.-C. amplifier and/or detector, instead of a D.-C. amplifier and/or detector may be used. It will also be understood that the light chopper wheel 40 and rotating means therefor may be employed in the radiation detector described and illustrated in Fig. 1. It will also be understood that the light chopping means comprising the shutter wheel 40 may be disposed in any suitable position within the container represented by the dashed line 38 in order to break the beam of light from the light source 22 to the photo-conductive element 32.

Thus, there is shown and described herein, in accordance with the objects of the present invention, a radiation detector wherein light from an auxiliary source is passed through a slab of photo-conductive material whose optical transmission is a function of incident radiation absorbed by light absorbing material on one surface of the slab. The amount of light transmitted through the slab twice, as a result of a mirror surface on one side of the slab, is directed onto a photo-conductive element. The radiation sensitive element is in a circuit for varying the voltage across a resistor in accordance with the intensity of the amount of light permitted to pass through the slab from the auxiliary source; the optical transmission of the slab being a function of the incident electromagnetic radiation to be detected and measured.

What is claimed is:
1. Apparatus for detecting infra-red energy to which said apparatus is exposed comprising a first slab of photo-conductive material having an optical transmission characteristic that varies with temperature, a mirror coating on one side of said slab, an infra-red energy absorbing material on said mirror coating, a source of light radiation, means to direct said radiation from said source through said slab to said mirror coating, a second slab of photo-conductive material positioned to receive said radiation reflected through said first slab by said mirror coating, said first slab upon exposure to infra-red energy directed towards said infra-red energy absorbing material changing in temperature and in optical transmission in proportion to the magnitude of infra-red energy absorbed thereby, and means coupled to said second slab to derive signals proportional to said reflected radiation received thereby.

2. A radiation detector comprising a first slab of photoconductive material having an optical transmission characteristic that varies with temperature, a mirror coating on one side of said slab, an infra-red energy absorbing material on said mirror coating, a source of light radiation, means to direct said radiation from said source towards the other side of said slab and therethrough to said mirror coating, a second photo-conductive slab positioned to receive said radiation reflected through said first slab by said mirror coating, said first slab being positioned to receive infra-red energy directed towards said infra-red energy absorbing material whereby to change the temperature and optical transmission of said first slab in proportion to the magnitude of said infra-red energy absorbed thereby, means comprising an electrical circuit connected to said second photo-conductive slab to derive signals proportional to said reflected radiation received thereby, and a semitransparent mirror positioned in the path of said radiation from said source to said first slab and comprising means to direct said reflected radiation from said mirror coating to said second slab.

3. A radiation detector comprising a first slab of photoconductive material having an optical transmission characteristic that varies with the temperature of said slab, a mirror coating on one side of said slab, an infra-red energy absorbing material in intimate contact with said mirror coating and disposed to absorb infra-red energy directed thereto whereby to vary the tempreature of said slab in proportion to the magnitude of said absorbed infra-red energy, a light source, means to direct light from said light source towards the other side of said slab and therethrough to said mirror coating, a second slab of photo-conductive material positioned to receive light reflected through said first slab by said mirror coating, and means in circuit with said second slab to derive signals proportional to said reflected light received thereby.

4. A radiation detector comprising a first slab of photoconductive material having an optical transmission characteristic that varies with the temperature of said slab, a mirror coating on one side of said slab, an infra-red energy absorbing material in intimate contact with said mirror coating and disposed to absorb infra-red energy directed thereto whereby to vary the temperature of said slab in proportion to the magnitude of said absorbed infra-red energy, a light source, means to direct light from said light source towards the other side of said slab and therethrough to said mirror coating, a second slab of photo-conductive material positioned to receive light reflected through said first slab by said mirror coating, means in circuit with said second slab to derive signals proportional to said reflected light received thereby, and said first and said second slab comprising similar material.

5. A radiation detector comprising a first slab of photoconductive material having an optical transmission characteristic that varies with the temperature of said slab, a mirror coating on one side of said slab, an infra-red energy absorbing material in intimate contact with said mirror coating and disposed to absorb infra-red energy directed thereto whereby to vary the temperature of slab in proportion to the magnitude of said absorbed infra-red energy, a light source, means to direct light from said light source towards the other side of said slab and therethrough to said mirror coating, a second slab of photo-conductive material positioned to receive light reflected through said first slab by said mirror coating, means in circuit with said second slab to derive signals proportional to said reflected light received thereby, and filter means between said light source and said first slab to monochromatize said light source.

6. A radiation detector comprising a first slab of photo-conductive material having an optical transmission characteristic that varies with the temperature of said slab, a mirror coating on one side of said slab, an infra-red energy absorbing material in intimate contact with said mirror coating and disposed to absorb infra-red energy directed thereto whereby to vary the temperature of said slab in proportion to the magnitude of said absorbed infra-red energy, a light source, means to direct light from said light source towards the other side of said slab and therethrough to said mirror coating, a second slab of photo-conductive material positioned to receive light reflected through said first slab by said mirror coating, means in circuit with said second slab to derive signals proportional to said reflected light received thereby and a semitransparent mirror in the path of said light from said light source to said first slab and comprising means to direct said reflected light from said mirror coating to said second slab.

7. A radiation detector comprising a first slab of photoconductive material having an optical transmission characteristic that varies with the temperature of said slab, mirror coating on one side of said slab, an infra-red energy absorbing material in intimate contact with said mirror coating and disposed to absorb infra-red energy directed thereto whereby to vary the temperature of said slab in proportion to the magnitude of said absorbed infra-red energy, a light source, means to direct light from said light source towards the other side of said slab and therethrough to said mirror coating, a second slab of photo-conductive material positioned to receive light reflected through said first slab by said mirror coating, means in circuit with said second slab to derive signals proportional to said reflected light received thereby, and means to vary the intensity of said light periodically.

8. A radiation detector comprising a first slab of photoconductive material having an optical transmission characteristic that varies with temperature, a mirror coating on one side of said slab, an infra-red energy absorbing material on said mirror coating, a source of light radiation, means to direct said radiation from said source towards the other side of said slab and therethrough to said mirror coating, a second slab of photo-conductive material positioned to receive said radiation reflected through said first slab by said mirror coating, said first slab being positioned to receive infra-red energy directed towards said infra-red energy absorbing material whereby to change the temperature and optical transmission of said first slab in proportion to the amplitude of said infra-red energy absorbed thereby, means in circuit with said second slab to derive signals proportional to said reflected radiation received thereby, means to periodically interrupt said radiation from said source, and said signal deriving means comprising A.-C. amplifying means.

References Cited in the file of this patent
UNITED STATES PATENTS

| | | |
|---|---|---|
| 2,678,400 | McKay | May 11, 1954 |
| 2,705,758 | Kaprelian | Apr. 5, 1955 |
| 2,706,792 | Jacobs | Apr. 19, 1955 |